Patented Nov. 7, 1950

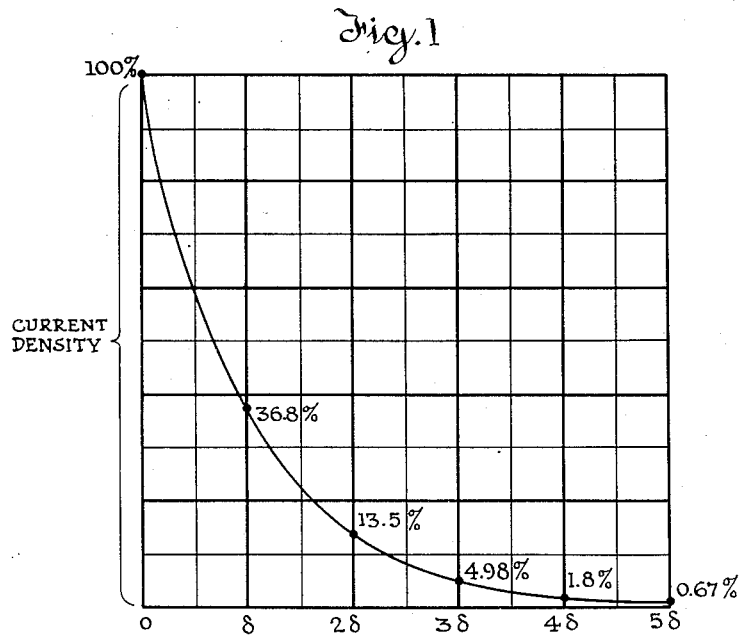
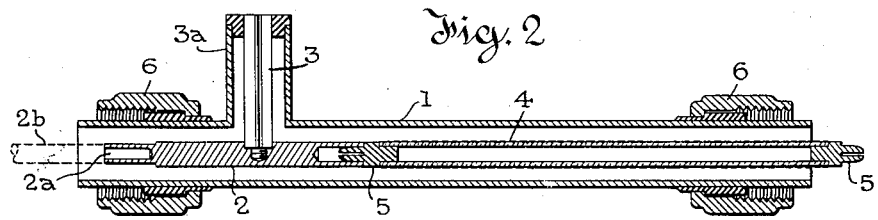
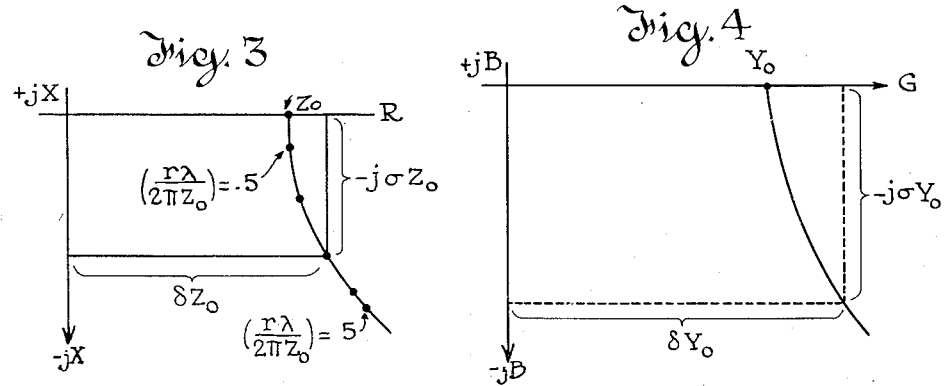
Inventor
Ernst Weber
and John W. E. Griemsmann
By Ralph B. Stewart
Attorney

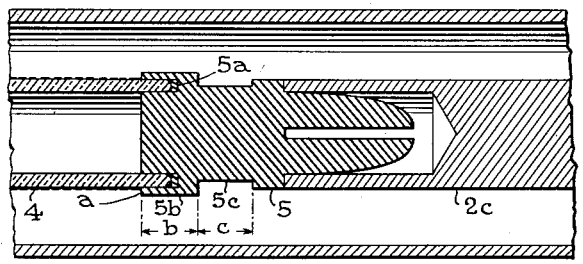
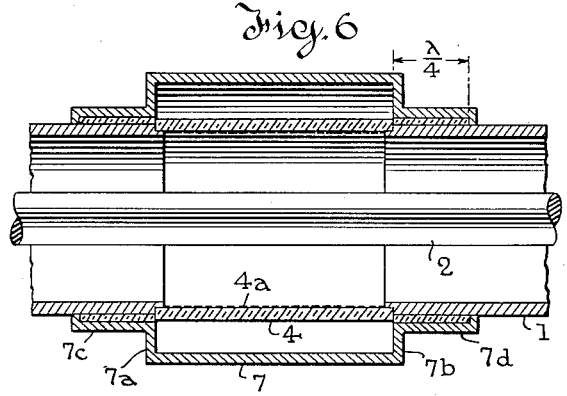
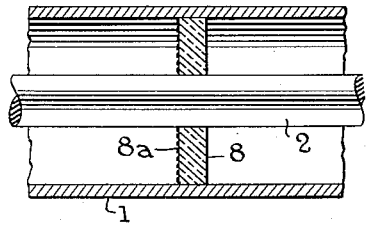
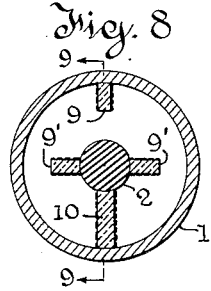
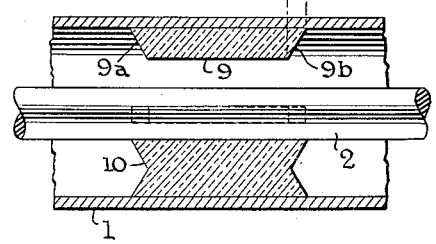
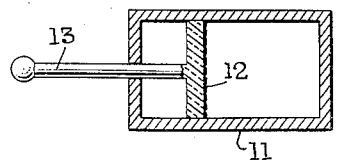

2,529,436

UNITED STATES PATENT OFFICE 2,529,436

METAL FILM ATTENUATOR

Ernst Weber, Mount Vernon, and John W. E. Griemsmann, Bellaire, N. Y., assignors to Polytechnic Institute of Brooklyn, Brooklyn, N. Y., a corporation of New York Application June 14, 1944, Serial No. 540,347

6 Claims. (Cl. 178—44)

This invention relates to attenuators for electric waves of high frequency. While the devices of the present invention are especially useful in the ultra high frequency range covering frequencies from 300 to 10,000 and more megacycles per second, the principles of the invention may be applied to other frequency ranges.

An object of the invention is to produce thin metal films which are highly stable with respect to humidity, temperature, and other influences and which may be used as conductors of high frequency currents. In the present invention the films are used in attenuator structures for attenuating high frequency currents, but the films may be employed for other purposes. For example, they may be employed as resistance elements in current measuring systems.

According to the present invention, the metal films formed on insulating supports have a thickness which is thin by comparison with the depth of penetration of the alternating current such that the direct current resistance becomes an effective measure of the high frequency resistance of the film.

Another object of the invention is to devise highly stable metal films having a low temperature coefficient of resistance. The films are formed of the dried and baked residue of a metallic solution, preferably a mixture of solutions of two or more pure noble metals. Such films have a temperature coefficient of resistance as low as ½ to ⅕ of the coefficients of the component metals. Furthermore, the films have higher specific resistivity than the component metals, which provides a practical advantage in production since it permits thicker films than for pure metals.

A further object of the invention is to devise a unitary structure embodying an attenuator element which may be inserted in a standard coaxial line as a fixed element or with a structure permitting a variable degree of attenuation.

Still another object is to devise fixed or variable attenuators for use in wave guides.

The attenuators of the present invention provide substantially constant rate of power absorption especially for moderate attenuation values and for all frequencies below frequencies for which the thickness of the attenuator film is a small fraction of the depth of penetration.

For the transmission of power at any frequency, and at low transmission loss, the transmission line may be formed of two conductors in any desired mutual arrangement, or the power may be transmitted by one conductor in the form of a hollow tube commonly called a wave guide. At very high frequencies, the electromagnetic field surrounding the conductors, or conducted within the single hollow conductor, penetrates into the metal only very slightly. It can be shown that the electromagnetic field, or the current density, decreases exponentially from the surface of the conductor towards the interior of the conductor, the active part of the conductor being limited to a depth of about three times the depth of penetration of the current at the frequency of transmission, and any additional depth or thickness of conductor has very little effect upon the active resistance of the transmission line. The present invention utilizes this characteristic of high frequency transmission to secure the desired attenuation of power by including in the transmission conductor a section having a relatively thin thickness with respect to the depth of penetration.

Attenuation of power flow in a transmission line can be accomplished by placing power absorbing materials into the strongest magnetic field of at least one of the conductors of the line, or by placing the material in the electrostatic field existing between two conductors of a multiple conductor line. In the first case, the attenuator would be a series element which forms a linear section of one of the conductors or wave guide, and in the second case the attenuator would be formed as a shunt unit placed between the two conductors of a transmission line or arranged transversely of a wave guide.

Heretofore, powdered materials of semi-conductive or conductive nature have been used as power absorbing or attenuator units, but such materials have the disadvantage of being unstable at high temperatures and are subject to variation with frequency, humidity, temperature, and even with the density of the current or electromagnetic field. According to the present invention the attenuator units are formed of stable metal films carried by a dielectric carrier or support, the films having a thickness of only a fraction of the depth of penetration for the frequency of transmission and having a low temperature coefficient.

In a coaxial transmission system, the series type of attenuator may be inserted in either the center conductor or the outer conductor, but it is preferred to embody the attenuator in the inner conductor to prevent radiation from the attenuator unit. Where the unit is embodied in the outer conductor of a coaxial system, or in a hollow wave guide, the unit must usually be properly shielded to prevent excessive radiation.

The invention and various embodiments thereof will be described in connection with the accompanying drawing in which:

Figure 1 is a curve showing variation in current density from the surface of a conductor towards the interior thereof;

Figure 2 is a longitudinal sectional view of one form of attenuator assembly for a coaxial line with the attenuator unit in the center conductor;

Figures 3 and 4 are impedance diagrams for the series and shunt types of attenuators respectively;

Figure 5 is a longitudinal sectional view of one end of an attenuator unit showing a preferred form of terminal connector;

Figure 6 shows a series attenuator unit embodied in the outer conductor of a coaxial cable or in a wave guide;

Figure 7 is a longitudinal sectional view showing one form of shunt attenuator unit in a coaxial cable;

Figure 8 is a transverse sectional view of a coaxial cable showing four different forms of shunt attenuator units;

Figure 9 is a sectional view of Figure 8 taken along lines 9—9; and

Figure 10 is a transverse sectional view of a rectangular wave guide showing a shunt attenuator unit mounted therein.

Figure 1 of the drawing shows the manner in which the current density in a conductor carrying high frequency current decreases from the surface of the conductor towards the interior thereof. As shown, with the current density at the surface of the conductor represented as 100%, the current decreases according to an exponential curve. At a distance $\delta$ from the surface of the conductor the current has decreased to 36.8% of the density at the surface, the distance $\delta$ being the "depth of penetration" of the current at the frequency of transmission. The depth of pentration is defined as the depth at which the current density is equal to $1/e$ of the current density at the surface, $e$ being the base of the natural logarithm. At $3\delta$ the current density has dropped to substantially 5% which may be said to be the practical limit of current penetration, and any thickness of conductor beyond this amount has very little effect on the resistance of the conductor. The value of $\delta$ is determined by the nature of the conducting material and the frequency of transmission. The factors are given in Equation 41 in an article by Ernst Weber appearing on pages 103 to 112 of "Electrical Engineering" for March, 1943. The metal films used in the present invention have a thickness less than the depth of penetration, and preferably only a fraction of this amount. In the ultra high frequency range, the films may have a thickness of the order of 100 angstrom units, although the thickness may be varied and will depend upon specific requirements of any given installation.

In Figure 2 is shown a unitary attenuator assembly which may be inserted in a coaxial line. This assembly comprises a short tubular housing 1 which preferably has the same diameter and wall thickness as the outer conductor of the coaxial line into which the assembly is to be inserted. A short section 2 of the center conductor is mounted by suitable means in one end of tube 1, and the outer end of this conductor section is provided with a socket 2a which receives the plug end of the center conductor from the adjacent section of the transmission line shown in dotted lines at 2b. The conductor section 2 may be mounted in tube 1 by any suitable means, but for the purpose of illustration it is shown in Figure 2 as being supported by a metallic stem 3 supported in a lateral extension 3a of tube 1, the electrically effective length of the stem 3 being equal to ¼ of the wave length of the current being transmitted.

The attenuator unit is embodied in the center conductor and is formed of an insulating rod or tube 4 (preferably pyrex glass or quartz) having a thin metallic film formed on the outer surface of the rod or tube. The tube 4 has an external diameter equal to the outside diameter of the center conductor of the coaxial system and is preferably provided with "bullet" type connector terminals 5 at opposite ends. The attenuator unit is supported in the assembly by engagement of one of the bullet terminals in a socket formed in the inner end of conductor section 2, while the other bullet terminal extends out of tube 1 by a distance suitable for entering the socket end of the center conductor of the adjacent section of the coaxial cable. It will be understood that when the attenuator assembly is inserted in the coaxial cable, the assembly is securely joined to the adjacent sections of the coaxial cable by suitable coupling devices involving the threaded nuts 6, 6 which have threaded engagement with coupling sleeves (not shown) which maintain tube 1 in alignment with the outer conductor sections of the coaxial cable.

The attenuator unit is preferably formed in the following manner: A suitable length of tubing 4 is coated on the outside with a metallic solution, preferably a resinate solution of two or more noble metals. For the purpose of securing metal films of low temperature coefficient, it is preferred to use a resinate solution containing platinum and palladium in atomic ratio of 1.5 to 1 respectively. For higher resistance it may be preferable to use an atomic ratio of 1 to 1. A small amount of rhodium is included for better fluxing and adherence to the glass tube in baking.

After the tube has been coated with the metal solution, it is rotated about its axis while the film is allowed to dry. It is then placed in an oven and baked for about seven minutes at a temperature within the range of about 590° C. to about 670° C., the tube being properly supported to prevent bending. The resulting baked metal film adheres to the glass tube very strongly and has a very stable resistance value which can be controlled to a certain extent by controlling the time of baking. The resistance of a stable film increases with increase in time of baking.

After the first coating and baking operation, the resistance value is measured, and if the desired resistance cannot be obtained within the limits of the coated tube, one or more additional coating and baking operations are applied until the desired resistance value is obtained between points spaced from the ends of the tube. Next, the ends of the tubes beyond the two spaced points are either coated with a metallic paste requiring baking only at lower temperature, or they are coated with the same metal solution, or with a stronger solution of a single noble metal such as platinum, to provide low resistance connector rings at each end of the tube. In the latter cases the tube is again baked at a temperature of approximately 650° C. for about five minutes. In constructions like that shown in Figure 2, the wall of the glass tube should be rounded on each end and the low resistance terminal rings should extend around the end of the tube wall. More than one coating and baking operation may be required to provide the necessary low resistance of the two terminal collars which are used for soldering the two bullet connectors to the two ends of the tube.

As shown in Figure 2, the two bullet connectors have an outside diameter equal to the outer diameter of the inner conductor and are provided with reduced shanks which extend into the ends of the tube 4. The connectors are preferably formed to provide a shallow groove at the base of the shoulder which surrounds the stem. In securing the connectors to the tube 4, each connector in turn is held with the stem in a vertical position and is heated while molten solder is deposited in the ring around the stem. One end of the tube 4 is then telescoped over the stem of the bullet and while the tube is maintained in vertical alignment with the bullet, heat is applied to the bullet and when the solder melts the glass is permitted to settle down under some controlled weight against the shoulder of the bullet. Upon removing the heat the solder solidifies and a firm soldered joint is obtained between the shoulder of the bullet and the low resistance terminal ring at the end of the tube.

While the preferred procedure is as indicated above, it is possible to first apply the low resistance terminal bands or collars to the ends of the glass tube before applying the attenuator film.

The length of the attenuator may be made any desired value depending on the attenuation required, the frequency variation of attenuation, and the degree of matching desired. The complex characteristic impedance of the line having the film in series arrangement may be written, because of the small value of the thickness, $$Z_c = (\delta - j\sigma) Z_0$$

where $\delta$ and $\sigma$ are factors which are functions of the parameter $$\left(\frac{r\lambda}{2\pi Z_0}\right)$$

only. There is a consequent unique correspondence between $\delta$ and $\sigma$, such that the locus for the characteristic impedance is given in Figure 3. In this figure, $r$ is the resistance of the film per cm., measured with direct current, $\lambda$ is the wavelength in cm. of the wave transmitted by the lossless coaxial line, and $Z_0$ is the characteristic impedance of the lossless line. R and X are resistive and reactive components of impedance, respectively. The attenuation per unit length in nepers/cm. is given by $$\frac{2\pi}{\lambda}\sigma$$

With proper considerations of the reflections arising from the introduction of the film, it is possible to design attenuators having the desired attenuation and match by utilizing the above formulae and resistance measured by direct current. Anticipated performance with respect to frequency variation and effect of manufacturing tolerances can also be calculated. For those units which require low attenuation per wavelength, the match is often sufficiently good without considering effect of length or thickness distribution of the film.

The diameter of tubing into which the element is placed has an effect on the attenuation in that the quantity $Z_0$ is dependent on the diameter ratio for coaxial line. This fact can also be utilized to advantage in designing the element.

When the film is used as a shunt resistance, we may write $$Y_c = (\delta - j\sigma) Y_0$$

with $Y_0$ the characteristic admittance of the cable without film, and employ a similar procedure to that above for design calculations (see Figure 4). Here, G and B are the resistive, and reactive parts of admittance, respectively.

In Figure 5 we have shown on an enlarged scale a longitudinal sectional view of a modified form of bullet connector. This construction involves certain advantages over the construction shown in Figure 2 and is the preferred form. The rear end of the shank of the bullet 5 has an outside diameter larger than the outside diameter of tube 4 which is of the same diameter as the central conductor 2c. The end of the shank is provided with an annular groove 5a into which the end of tube 4 is positioned. Thus a thin metallic collar 5b having a thickness, $a$, surrounds the end of tube 4. The shank is of the same diameter as the collar 5b for a distance $b$, and then a shallow groove 5c is formed around the surface of the shank and has a width $c$ equal to the width $b$ of the collar. The groove 5c extends as far below the surface of conductor 2c and tube 4 as the ring 5b extends above these surfaces. The purpose in providing the groove 5c is to compensate for the discontinuity in the conductor shape caused by the collar 5b, in other words, any wave reflection caused by collar 5b is compensated or cancelled by a corresponding reflection caused by groove 5c, and vice versa. Any part of the bullet shank lying between the groove 5c and the end of center conductor 2c has the same outside diameter as the conductor 2c. It will be understood, however, that the end of the conductor 2c may form one side wall of the groove 5c. The tube 4 is provided with the necessary attenuator film and low resistance terminal rings according to the process described above in connection with Figure 2, and the bullet conductors are soldered to the tube by first tinning the terminal ring of the tube and then inserting the end of the tube in the annular groove 5a which has previously been filled with solder. This construction provides a stronger mechanical connection of the bullet to the attenuator tube.

Figure 6 is a longitudinal sectional view showing a series attenuator unit embodied in the outer conductor of a coaxial cable or suitable for a wave guide. In this construction the attenuating film 4a is formed on the inner surface of an insulating tube 4 which forms a linear section of the outer tubular conductor 1 of the cable. The center conductor is shown at 2, but this conductor would be omitted in the case of a wave guide. It will be understood that the film 4a is formed on the cylinder 4 in the manner described above in connection with Figure 2, the film being provided with low resistance terminal rings at each end which have suitable contact with the adjacent sections of outer conductor 1. For example, the low resistance terminal rings may be soldered to thin sleeves formed on the ends of outer conductor 1 and extending into the cylinder 4 as shown in the drawing.

For the purpose of preventing excessive radiation from the attenuator section of the cable or wave guide, an annular metal shield 7 surrounds the attenuator cylinder 4 and is provided with parallel end walls 7a and 7b. For the purpose of preventing shield 7 from acting as a shunt path around the attenuator film, the end wall sections 7a and 7b of shield 7 are not connected directly to outer conductor 1 but are connected to the conductor through sleeves 7c and 7d arranged concentric with conductor 1 but spaced or insulated therefrom. The space between these two sleeves and the conductor 1 may be filled with suitable insulating material if desired. As will be seen from Figure 6, the outer ends of sleeves 7c and 7d are connected with conductor 1 and these sleeves have an effective length equal to ¼ of the wave length to be transmitted. This construction provides an effective open circuit between the ends of adjacent sections of tube 1 and the end walls of metal shield 7.

Figure 7 is a longitudinal sectional view of a section of coaxial cable showing one form of shunt attenuator which may be employed. In this arrangement, the attenuator film 8a is formed on one or both faces of an annular disk 8 formed of suitable insulating material such as pyrex glass or quartz. The disk 8 surrounds the inner conductor 2 and is positioned within the outer conductor 1, and preferably the film 8a is electrically connected by any suitable means with these two conductors.

Figure 8 is a transverse sectional view of a coaxial cable showing three further modifications of shunt attenuator units which may be employed, and Figure 9 is a longitudinal sectional view of Figure 8 taken along the cutting line 9—9. One form of shunt attenuator unit shown in Figures 8 and 9 comprises a flat plate-like carrier 9 secured to the inner wall of the outer tubular conductor 1 and provided with tapering end portions 9a and 9b. These end portions have a length equal to one-half the wavelength of transmission. One or both faces of the carrier 9 are provided with a thin metallic film formed as described above, and the film or films are connected, as by soldering, with the inner surface of conductor 1.

Instead of being attached to the outer conductor, the attenuator unit like that shown at 9 may be attached to the surface of the inner conductor 2 as shown at 9'.

The attenuator unit shown at 10 comprises a plate-like carrier provided with a thin metallic film on one or both faces thereof and mounted so that the films extend from the outer conductor 1 to the inner conductor 2. The ends of the carrier 10 may be formed as shown in Figure 9 or in other known ways to cut down reflection losses.

It will be understood that the form of attenuator shown at 9 in Figure 8 is useful in a wave guide as well as in a coaxial cable.

Figure 10 is a transverse sectional view of a rectangular wave guide 11 showing a shunt attenuator unit 12 mounted therein. This attenuator unit may be formed of a plate-like dielectric carrier 12 having one or both faces thereof provided with a thin metallic coating as described above. The plate 12 is mounted parallel with the axis of the guide 11 and transversely of the narrow dimension of the guide. The plate may be fixed in position and the films soldered to the inner walls of the wave guide, or the attenuator unit may be mounted to be adjusted transversely of the wave guide in order to place the attenuator unit in regions of different field strength. It is known that in most practical cases the electrostatic field is strongest at the center of the guide and decreases towards the sides. Accordingly, by varying the position of the attenuator unit, as by shifting the unit by means of an insulating rod 13 extending through one side wall, it is possible to vary the amount of attenuation produced by the unit. No special provision need be made for insuring contact between the attenuator films and the inner walls of the wave guide, but if desired, resilient conducting strips can be inserted between the edges of the attenuator unit and the contacting walls of the wave guide, the films being connected to the walls through the resilient strips.

We claim:

1. An attenuator assembly for use in a coaxial cable comprising, in combination, a cylindrical housing having an inside diameter corresponding to that of the tubular conductor of said cable, detachable coupling means for coupling each end of said housing with adjacent sections of said cable, a quarter-wave coaxial stub provided on said housing near one end thereof, a short section of center conductor supported in one end of said housing by said stub in a position to engage the center conductor of one section of said cable, an attenuator unit positioned in the other end of said housing and being supported by said section of central conductor by detachable coupling means, the outer end of said attenuator unit being positioned to engage the center conductor in the other section of said cable.

2. An attenuator for a coaxial cable comprising in combination, a tubular outer conductor, a center conductor mounted within said tubular conductor and formed of a section of relatively high resistance interposed between two sections of low resistance, all of said sections being of the same outside diameter, a pair of coupling collars at the ends of said high resistance section, said collars having a diameter larger than the diameter of said central conductor, and each of said collars being connected to the adjacent low resistance section by a section of reduced diameter having a length equal to the length of the coupling collar, whereby reflections produced by said coupling collars are compensated by corresponding reflections from said sections of reduced diameter.

3. An attenuator assembly for use in a coaxial cable comprising, in combination, a cylindrical housing having an inside diameter corresponding to that of the tubular conductor of said cable, detachable coupling means for coupling each end of said housing with adjacent sections of said cable, means rigidly supporting a short section of center conductor within one end of said housing and in a position to engage the center conductor of one section of said cable, an attenuator unit positioned in the other end of said housing in a position to engage the center conductor of the other section of cable, and detachable coupling means securing the inner end of said attenuator unit to said short section of center conductor, whereby said unit may be removed through the open end of said housing.

4. An attenuator unit comprising a cylindrical dielectric carrier having a high resistance metallic film formed thereon, and a pair of terminal members mounted on the ends of said carrier in contact with said film, each terminal member comprising a cylindrical metallic member having a cup-shaped socket portion at one end thereof for receiving one end of said carrier and having electrical contact with said high resistance film, and each terminal member having a ring-shaped groove formed around the surface thereof immediately adjacent said socket portion, said groove extending below the cylindrical surface of said carrier to the same extent that the socket portion extends above said surface, and said groove having a width equal to the length of said socket portion, the section of each terminal member forming the outer boundary of said groove being of the same diameter as said carrier.

5. An attenuator unit for use in the inner conductor of a coaxial cable for the transmission of high frequency waves comprising a cylindrical dielectric carrier having low resistance terminal collars formed at each end thereof and comprising rings of thin metallic film, a thin metallic film of relatively high resistance on said carrier and bridging said collars, and a pair of bullet-type terminal connectors mounted on the ends of said carrier and having good electrical contact with said collars, said bullet connectors having rear end sections of larger external diameter than the diameter of said carrier and the ends of said carrier extend into sockets formed in the rear ends of said connectors, each of said bullets having forward end sections of the same diameter as the carrier and each bullet having a ring-shaped groove formed around the surface thereof between said end sections, said groove having a diameter less than the diameter of said carrier to compensate for the wave reflection caused by the increased diameter of the rear section of said bullets.

6. An attenuator unit for use in the inner conductor of a coaxial cable for the transmission of high frequency waves comprising, and elongated resistance member having the same external diameter as the diameter of said inner conductor, a low resistance terminal element mounted on each end of said resistance member, each terminal element having an end section of larger diameter than the said resistance member and having a socket formed therein for receiving the end of said resistance member, said enlarged end section forming a coupling collar for joining said terminal element with said resistance element, the other end section of each terminal element being of the same diameter as said resistance member, and each terminal member having a shallow groove formed between the said terminal sections, said groove having a depth equal to the thickness of said coupling collar and a width equal to the length of said coupling collar.

ERNST WEBER.
JOHN W. E. GRIEMSMANN.

REFERENCES CITED

The following references are of record in the file of this patent:

UNITED STATES PATENTS

| Number | Name | Date |
|---|---|---|
| 1,717,712 | Loewe | June 18, 1929 |
| 1,835,582 | Allen | Dec. 8, 1931 |
| 1,905,353 | Potter | Apr. 25, 1933 |
| 1,957,538 | Jensen | May 8, 1934 |
| 2,030,178 | Potter | Feb. 11, 1936 |
| 2,059,034 | Roosenstein | Oct. 27, 1936 |
| 2,125,597 | White | Aug. 2, 1938 |
| 2,151,157 | Schelkunoff | Mar. 21, 1939 |
| 2,197,122 | Bowen | Apr. 16, 1940 |
| 2,197,123 | King | Apr. 16, 1940 |
| 2,262,134 | Brown | Nov. 11, 1941 |
| 2,281,843 | Jira | May 5, 1942 |
| 2,429,401 | Davis | Oct. 21, 1947 |